March 7, 1950  J. D'AVILA  2,499,465
BUCK RAKE

Filed Feb. 24, 1947  4 Sheets-Sheet 3

INVENTOR
BY John D'Avila
Harry C. Schroeder
ATTORNEY

March 7, 1950     J. D'AVILA     2,499,465
BUCK RAKE

Filed Feb. 24, 1947     4 Sheets-Sheet 4

INVENTOR.
John D'Avila
BY Harry Q. Schwede
ATTORNEY

Patented Mar. 7, 1950

2,499,465

UNITED STATES PATENT OFFICE 2,499,465

BUCK RAKE

John D'Avila, Richmond, Calif.

Application February 24, 1947, Serial No. 730,468

1 Claim. (Cl. 56—27)

This invention relates to hay rakes and particularly to buck rakes, the main object being to provide a buck rake which may be removably attached to a tractor.

A further object is to provide a buck rake which may be controlled entirely by means of hand operated levers which are so arranged as to utilize the forward thrust of the tractor in assisting the operator with the manipulation of the levers.

A further object is to provide a means of pushing the hay off the rake when desired.

A still further object is to provide a safety release which will allow the prongs of the rake to raise when working on rough terrain.

A still further object is to provide an adjustment which will vary the degree of the tendency of the prongs to raise when device is in operation.

In the drawings:

Figure 5 is a top plan view of the control levers.

Figure 1:
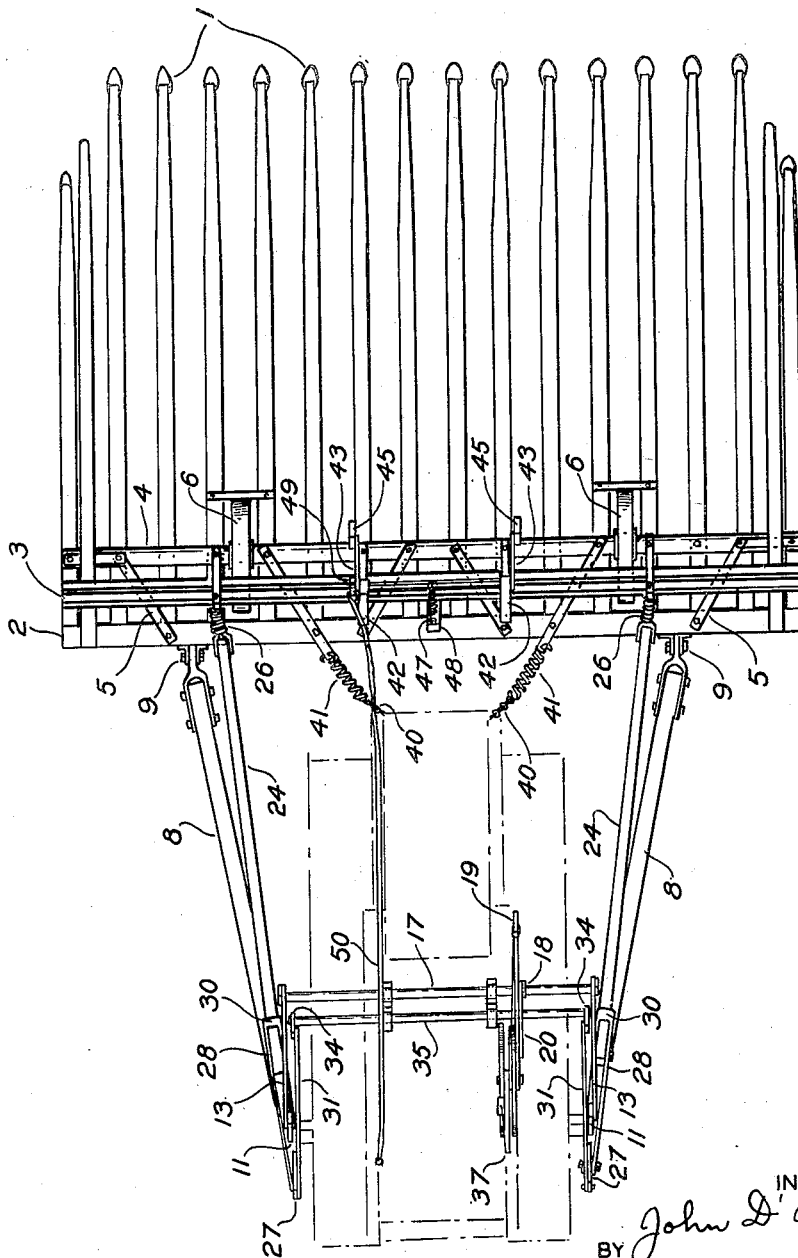
Figure 1 is a top plan view of the device.

Referring to the numerals of reference on the drawings, the device comprises a number of prongs 1, which are similar in construction to those used on a conventional buck rake, being held in spaced, parallel relationship by a crossbar 2, and provided with a backstop 3, for the hay.

In this invention the rake is, supported on an axle 4, which is disposed athwart the prongs 1, a short distance forward of the cross-bar 2, and which is held in position by suitable bracing 5.

Figure 7:
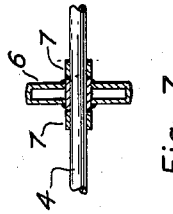
Figure 7 is a partial sectional view taken on line 7—7 of Figure 6 and showing the construction of the wheels.
Figure 8:
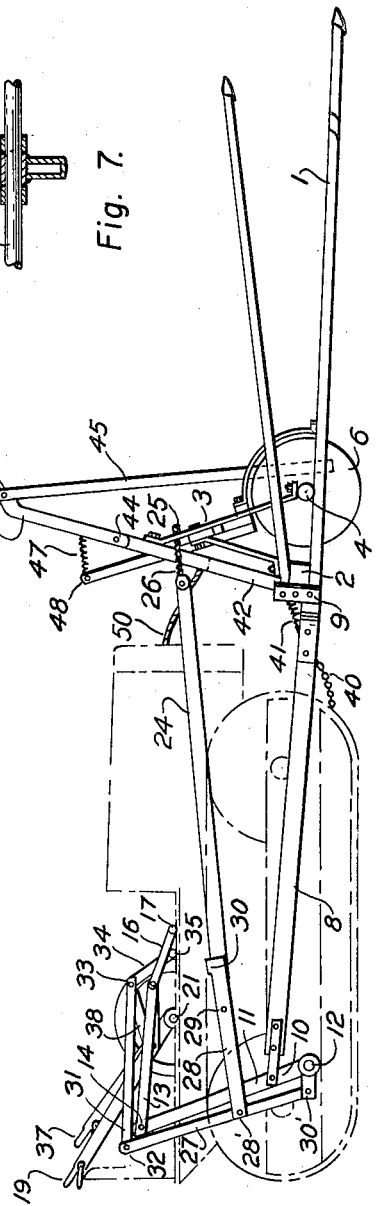
Figure 8 is a side elevation of the device in the intermediate carrying position.

A plurality of wheels 6, are disposed along the axle 4, the wheels 6, being of hollow metal construction with a crowned periphery and held in position by collars 7, on either side of the wheel 6, as shown in Figure 7. The wheels 6, are of sufficiently rugged construction to withstand dragging in an axial direction as when the tractor is turning.

The forward thrust of the tractor is transferred to the rake by a pair of lower thrust bars 8, which are attached to the cross-bar 2, by means of two adjustable pin joints 9. The rear end of the thrust bars 8, are attached by means of pin joints 10, to two forward lever arms 11, which are pivotally connected to the frame of the tractor as at 12.

The forward lever arms 11, extend upward, beyond the joints 10, and are connected to two tension links 13, by pin joints 14. The other ends of the tension links 13, are connected by means of pin joints 15, to two crank arms 16, which are rigidly attached to both ends of a forward torque shaft 17, which is rotatably mounted on the tractor.

An intermediate crank arm 18, is rigidly attached to the shaft 17, in a position substantially in line with the crank arms 16, and is also aligned with a forward thrust control lever 19, to which it is connected by means of pin joints and a compression link 20.

The lever 19, is hingeably mounted on the tractor as at 21, and operates in connection with a quadrant 22, which is provided with recesses 23, which engage a dog and hold the lever 19, in the extreme forward or rear positions, when desired. The lever 19, is free to travel through the portion of the arc of the quadrant 22, between the recesses 23.

A pair of tension bars 24, are attached to the backstop 3, the connection being made by means of a sliding bar 25, which is restrained from pulling through the holes in the back stop 3, by cross pins, and insulated against sudden jerks by a compression spring 26.

The rear end of the tension bars 24, are attached to two load lifting lever arms 27, by means of safety releases 28, which are connected to the lever arms 27, by pin joints 28' and to the tension bars by hinge pins 29. The safety release 28 is constructed to extend beyond the hinge pin 29, and is provided with a stop 30, which restrains the hinging movement beyond a point where the hinge pin 29, is still slightly above the line of force which acts between the sliding bar connection 25, and the pin joint 28'.

The lever arms 27, are pivotally connected to the frame of the tractor at 30' and extend upwardly beyond the pin joints 28', and are connected to two compression links 31, by means of pin joints 32. The other ends of the compression links 31, are connected by means of pin joints 33, to two crank arms 34, which are rigidly attached to the ends of a rear torque shaft 35, which is rotatably mounted on the tractor.

An intermediate crank arm 36, is rigidly attached to the shaft 35 in a position substantially in line with the crank arms 34, and is also aligned with a load lifting control lever 37, to which it is connected by means of pin joints and a tension link 38.

The lever 37, is hingeably mounted on the tractor as at 21, and operates in connection with a quadrant 39, which is provided with a recess which engages a dog and holds the lever 37, in the extreme rear position when desired. The lever 37, is free to travel over the portion of the arc of the quadrant 39, which is forward of the recess.

Two chains 40 are fastened to the lower forward portion of the tractor frame and to two heavy tension springs 41, the other ends of which are fastened to the cross-bar 2 in a manner that will hold the rake in line with the tractor.

Two rigid standards 42, extend obliquely up and forward from the cross-bar 2, and support a swinging frame 43, which is hingeably attached to the upper ends of the standards 42 as at 44.

Two bars 45, are hingeably attached to the sides of the frame 43, at its end as at 46, and depend downwardly to a point slightly above the ground.

The frame 43, is held in its normal position by a tension spring 47, which acts between the frame 43, and an extending arm 48 which is fastened to the backstop 3.

An arm 49 extends downward from the frame 43, to a point below the hinge point 44, and a rope 50, is attached to its end. The other end of the rope 50, is tied to the tractor, within easy reach of the operator.

Figure 3:
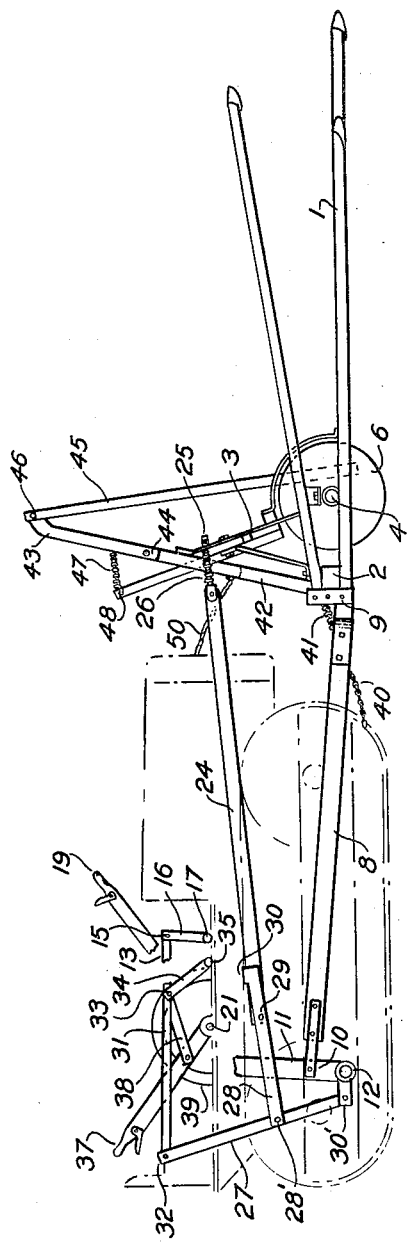
Figure 3 is a side elevation of the rake in position for carrying a load.
Figure 4:
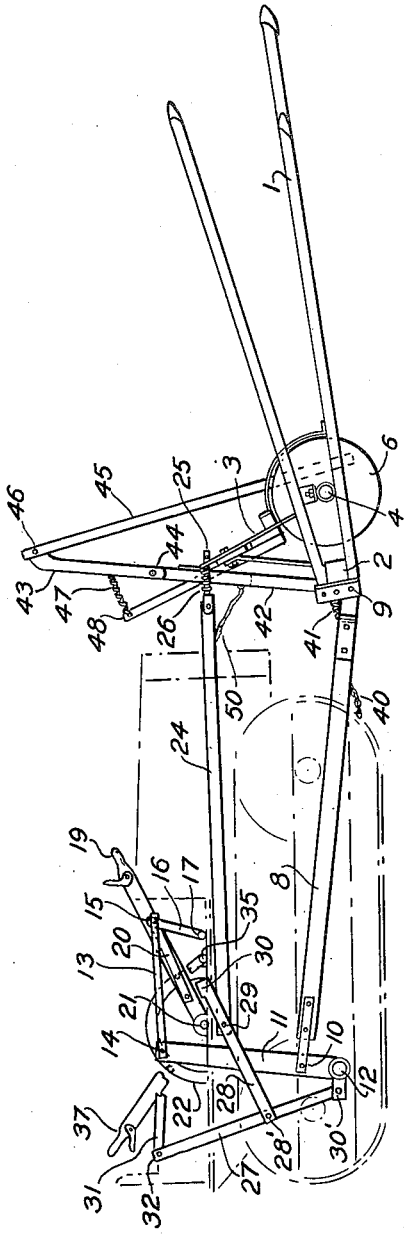
Figure 4 is a side elevation of the device in the carrying position and showing the safety release in the position it assumes when the prongs of the rake are raised, as when the device passes over a high or low place in the ground.

In use the device may be moved about when empty by setting the controls as shown in Figures 3 and 4, with the forward thrust control lever 19, secured by the dog in the extreme forward position, which sets the lower thrust bars 8, in their extreme forward position and the load lifting control lever 37, set and secured by the dog in its extreme rear position, which holds the tension bars 24, in their extreme rear position. In this position the prongs 1, will be clear of the ground as shown in Figure 3.

Figure 2:
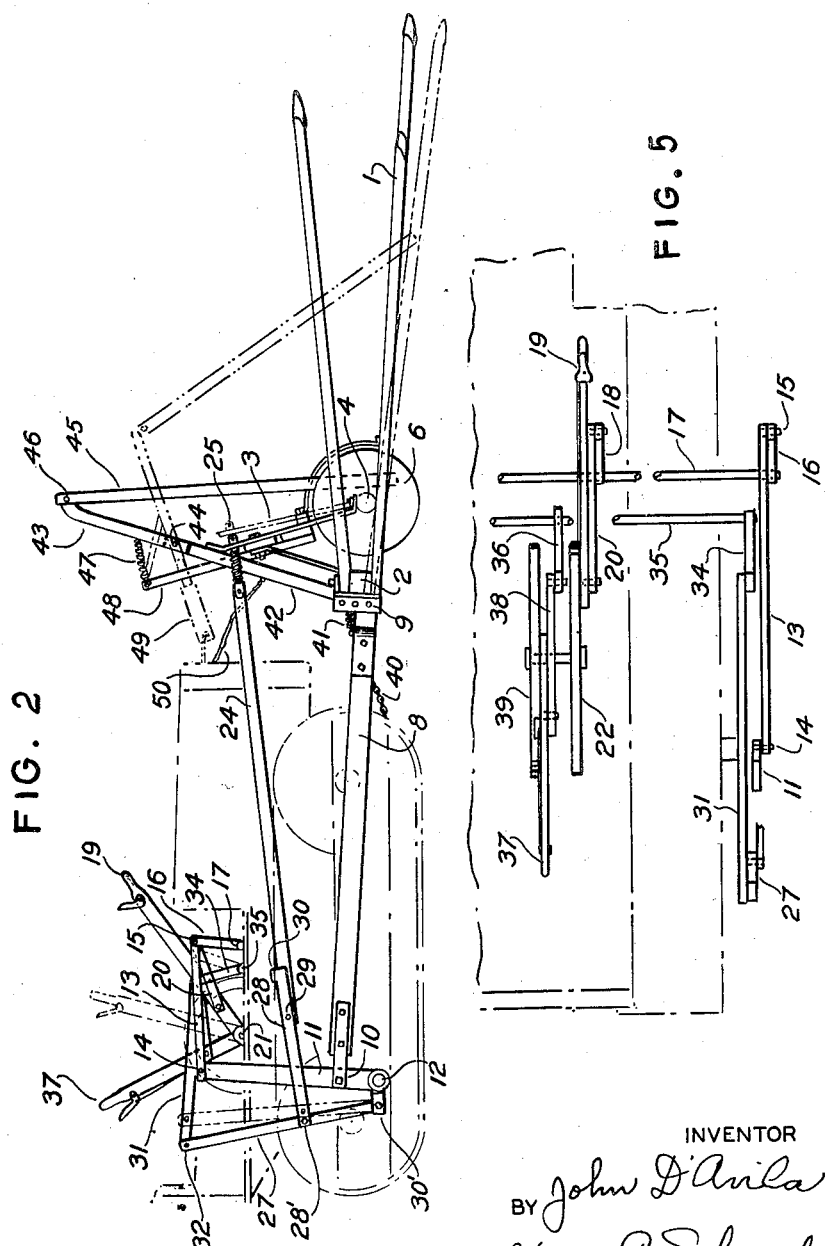
Figure 2 is a side elevation of the device with the controls in position to unload.
Figure 6:
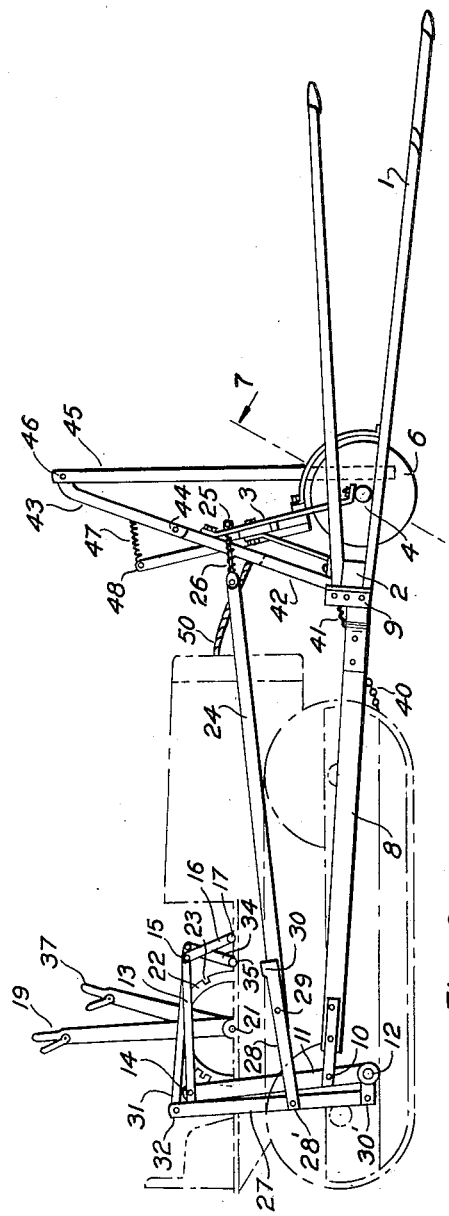
Figure 6 is a side elevation of the device in position for loading, or sweeping position.

When picking up a load of hay the device is either set in the position shown in Figure 6, or in the position shown in Figure 2.

In the position shown in Figure 6, both control levers are free to move back and forth, allowing the prongs 1, to ride along the ground and pick up the hay. In this position, however, some of the weight on the prongs 1, is carried by the wheels 6, by reason of the fact that the drag of the device is transferred by the thrust bar 8, to the forward lever arms 11, which bears against the load lifting lever arms 27. A portion of the drag, (the amount depending on the ratio of the leverages between pin joints 10, and 28') is therefore transferred to tension at the sliding bar connection 25, which tends to raise the prongs 1. The balance of the system may be adjusted by changing the pin joint connection 9, to another of a plurality of holes.

In the position shown in Figure 2, the forward thrust control lever 19, is secured by the dog in its extreme forward position, and the load lifting control lever is free to move back and forth. In this position the prongs 1, will hug the ground a little closer as there is little or no tendency to lift the ends of the prongs 1.

When the rake is loaded and it is desired to carry the hay, both of the control levers 19 and 37 are pulled back by the operator to the extreme rear position and the load lifting lever 37, is secured by the dog. This operation is facilitated by reason of the fact that the drag induced by pushing the device forward is transferred to the forward lever arm 11, and tends to urge both control levers to the rear.

The forward thrust control lever 19, may then be pushed forward and secured by the dog in the extreme forward position. The prongs 1, will then be clear of the ground and the operator may then proceed to deliver the load.

When a high place in the field is encountered the prongs will contact the ground and rise as shown in Figure 4. As the prongs 1, rise, the tension is relieved from the tension bars 24, and changed to compression and the safety release 28, will open as shown in Figure 4.

When it is desired to unload the device, the load lifting control lever 37, is released and allowed to move forward, as indicated by the dotted lines in Figure 2.

The operator then pulls the rope 50, which swings the frame 43 and forces the end of the bars 45 into the ground. The tractor and the rake are then drawn back as the operator continues to hold the rope 50, in tension, so that the bars 45, and the frame 43, will assume the position indicated by the dotted lines in Figure 2.

The hay will bear against the bars 45 and the rake is withdrawn from under the hay, the rope 50, is released allowing the spring 47, to pull the frame 43, and the bars 45, back to their normal position and the operator may then go for another load.

While I have disclosed a preferred embodiment of my invention, it will be understood that modification may be made within the spirit and scope of the appended claim.

I claim:

A buck rake for tractors comprising a rake frame attached in front of a tractor, wheels rotatably supporting said rake frame, a pair of lower thrust bars the front end of each bar being attached to the lower portion of said frame, a lever for operating said thrust bars connected to the rear ends of said bars, a pair of tension bars the front end of each tension bar being attached to the upper portion of said rake frame, said tension bars being adapted to collapse when compression force is applied thereto, a lever for operating said tension bars connected to the rear ends of the latter bars, said levers having locking means adapted to slide over respective quadrants, means on the quadrants for locking said levers in certain positions and for permitting said levers to oscillate between said positions, and means for keeping said rake in longitudinal alignment with the tractor.

JOHN D'AVILA.

REFERENCES CITED

The following references are of record in the file of this patent:

UNITED STATES PATENTS

| Number | Name | Date |
|---|---|---|
| 2,138,711 | Rohwer | Nov. 29, 1938 |
| 2,295,917 | Schwan | Sept. 15, 1942 |
| 2,373,710 | Rutledge | Apr. 17, 1945 |